United States Patent
Teshima et al.

(10) Patent No.: US 7,031,237 B1
(45) Date of Patent: Apr. 18, 2006

(54) DISCONTINUOUS POSITION DETECTING DEVICE AND METHOD FOR DETECTING A DISCONTINUOUS POSITION

(75) Inventors: Hideaki Teshima, Tokoname (JP); Ryuji Yamada, Ogaki (JP); Yoshihiko Horibe, Nagoya (JP); Kenji Miyata, Nagoya (JP); Sunao Kawai, Toyoake (JP); Kazuma Aoki, Kasugai (JP); Norihisa Fujii, Tokoname (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1060 days.

(21) Appl. No.: 09/692,100

(22) Filed: Oct. 20, 2000

(30) Foreign Application Priority Data

Oct. 20, 1999 (JP) ................................. 11-298381

(51) Int. Cl.
*G11B 27/10* (2006.01)
*H04N 5/93* (2006.01)

(52) U.S. Cl. ............... 369/47.1; 369/47.19; 369/47.22; 369/47.43; 386/52; 386/55; 386/68; 386/69; 386/91; 386/98

(58) Field of Classification Search ............... 369/47.1, 369/47.54, 47.15, 53.24, 47.22, 47.31, 47.32, 369/30.01, 30.17, 30.04, 30.1, 47.19, 47.28, 369/47.33, 47.43, 30.15; 386/69, 94, 55, 386/95, 126, 109, 51, 68, 91, 65, 46, 81, 386/98; 360/48, 72.2, 53; 358/908
See application file for complete search history.

(56) References Cited

U.S. PATENT DOCUMENTS 5,337,296 A * 8/1994 Okubo ....................... 369/30.1
5,369,532 A * 11/1994 Dodt et al. ................... 360/48
5,644,675 A * 7/1997 Kaaden et al. ................. 386/60

(Continued)

FOREIGN PATENT DOCUMENTS

JP          8-161872        6/1996

Primary Examiner—William Korzuch
Assistant Examiner—Kim-Kwok Chu
(74) Attorney, Agent, or Firm—Oliff & Berridge, PLC (57) ABSTRACT

A discontinuous position detecting device for detecting a discontinuous position at which date and time information indicative of date and time of recording on a recording medium is discontinuous, the discontinuous position detecting unit including, a scanning unit that scans the recording medium in a first direction and in a second direction that is different from the first direction, a first detecting unit that detects a temporary discontinuous position located in a vicinity of the actual discontinuous position while the scanning unit scans the recording medium in the first direction, a second detecting unit that detects the actual discontinuous position while the scanning unit scans the recording medium in the second direction, and a scan controller that controls the scanning unit to scan the recording medium at a first scan speed except while the second detecting unit detects the actual discontinuous position, and to scan the recording medium at a second scan speed while the second detecting unit detects the actual discontinuous position, the second scan speed being slower than the first scan speed.

21 Claims, 9 Drawing Sheets

U.S. PATENT DOCUMENTS

| | | | |
|---|---|---|---|
| 5,668,916 A * | 9/1997 | Fujinami | 386/47 |
| 5,774,435 A * | 6/1998 | Hirano | 369/47.22 |
| 5,832,173 A * | 11/1998 | Terasawa et al. | 386/69 |
| 5,862,296 A * | 1/1999 | Oyama | 386/69 |
| 5,966,495 A * | 10/1999 | Takahashi et al. | 386/68 |
| 5,999,688 A * | 12/1999 | Iggulden et al. | 386/46 |
| RE36,590 E * | 2/2000 | Yanagi | 369/30.17 |
| 6,108,281 A * | 8/2000 | Tozaki et al. | 369/30.04 |
| 6,115,537 A * | 9/2000 | Yamada et al. | 386/109 |
| 6,175,683 B1 * | 1/2001 | Sugimura et al. | 386/95 |
| 6,256,453 B1 * | 7/2001 | Takano | 386/126 |
| 6,314,233 B1 * | 11/2001 | Oyama | 386/68 |
| 6,526,218 B1 * | 2/2003 | Matsumoto | 386/55 |

\* cited by examiner

DISCONTINUOUS POSITION DETECTING DEVICE AND METHOD FOR DETECTING A DISCONTINUOUS POSITION

BACKGROUND OF THE INVENTION

1. Field of the Invention

The invention relates to a discontinuous position detecting device and a method of detecting a discontinuous position that detects an actual position at which data and time information recorded on a magnetic tape is discontinuous.

2. Description of the Related Art

It has become possible for a recording device to record video data and audio data on videotape over a long period, according to improvements in high-density recording and data compression. For example, there has been developed an optical disk recording system that writes a collection of video and audio data that has been separately recorded by a videocassette recorder (VCR) into an optical disk (DVD-R). Further, there has been developed an optical disk player that reproduces video and audio data optionally selected by a user out of an optical disk (DVD).

Figure 6:
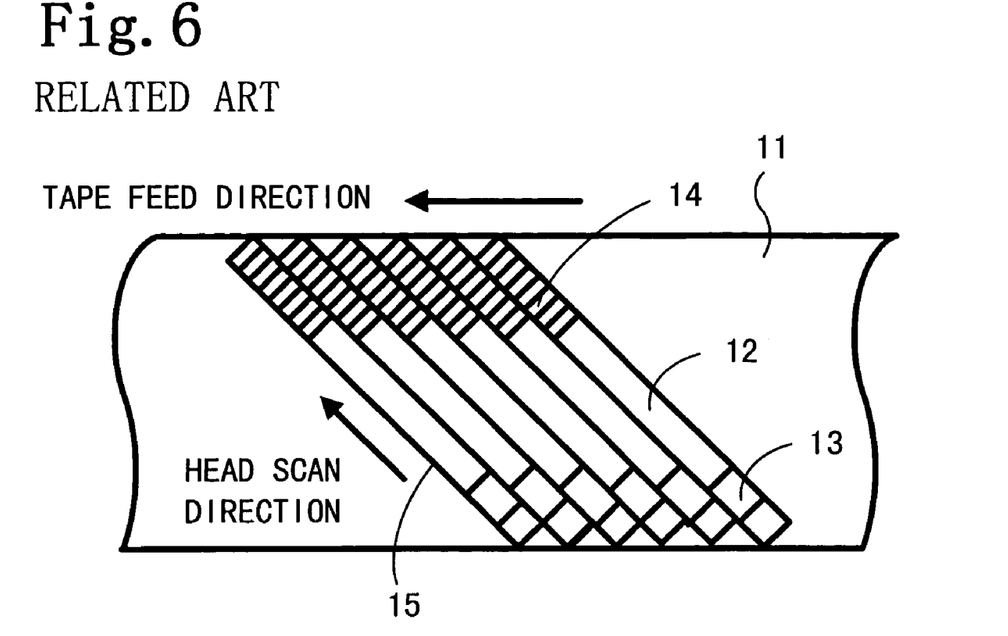
FIG. 6 is a schematic illustration of a memory structure of a videotape.

FIG. 6 is a schematic illustration of a memory structure of a videotape 11 storing video and audio data thereon. The videotape 11 has a memory structure composed of a plurality of video tracks 15, each video track 15 having a video area 12 that stores video data, an audio area 13 that stores sound data and a sub-code area 14 that stores various information on the videotape 11. Ordinarily, the sub-code area 14 stores date and time information indicative of a date and time of recording, and time code information indicative of a tape position used for editing. The date and time information and the time code information is stored on the videotape 11 in relation to the video data and the audio data. The recording device records the date and time information, by using its calendar/clock function, on the videotape 11. Accordingly, when the recording is performed continuously, the date and time information is stored continuously on the videotape 11. On the other hand, when the recording is performed discontinuously, the date and time information on the videotape 11 becomes discontinuous. As the date and time of recording is changed at a position where the recording is stopped and restarted (hereinafter referred to as a discontinuous position). The recording device records, as the time code information, a time code of recording that is continued from the time code of previous recording. Therefore, the time code information is stored in absolute time continuing throughout the videotape 11, and is ordinarily composed of information on hours, minutes, seconds and frame number.

Figure 7:
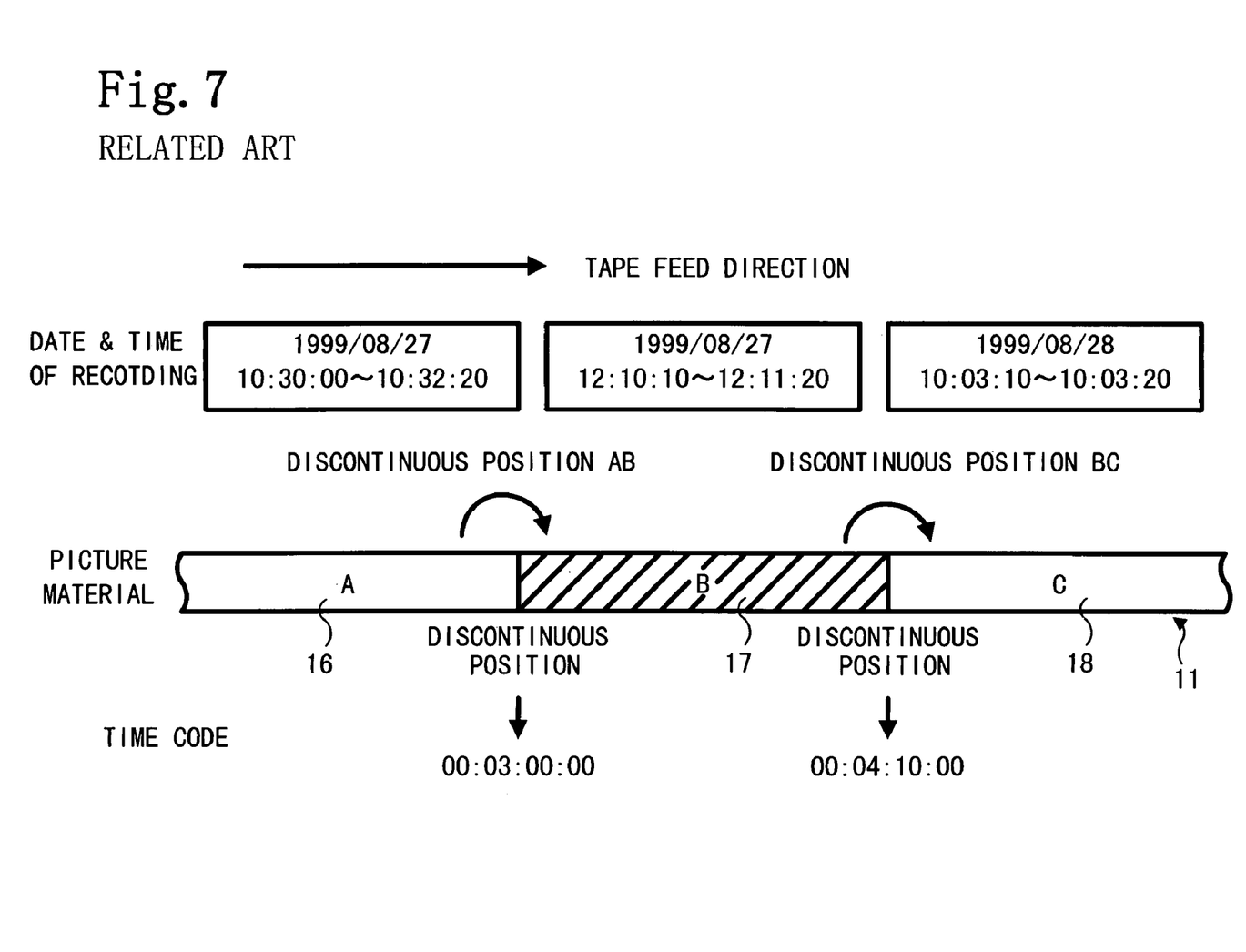
FIG. 7 is a schematic illustration of the discontinuous positions of the date and time information between picture materials.

By using such date and time information and time code information, a user can easily select his desired picture materials from the videotape. Herein, the term "picture material" refers to as a collection of video and audio data indicative of a series of images and sounds. Japanese Laid-Open Patent No. 8-161872 discloses a picture material detecting device that detects and cuts picture materials out of the videotape by using the above-mentioned discontinuous positions of the date and time information. FIG. 7 is a schematic illustration of discontinuous positions AB and BC between picture materials, A 16, B 17 and C 18 recorded on a videotape 11, by way of example. Herein, it is assumed that the picture material detecting device uses such discontinuous positions AB and BC to cut the picture material B 17 from the videotape 11. When the date and time information is monitored while reproducing the videotape 11 in a tape feed direction (indicated by an arrow in FIG. 7), there is detected the discontinuous position AB between the end of the picture material A-16 (1999 Aug. 27 10:32:20) and the start of the picture material B 17 (1999 Aug. 27 12:10:10). This discontinuous position AB corresponds to a start time code of the picture material B 17 (00:03:00;00). Further, there is detected the discontinuous position BC between the end of the picture material B 17 (1999 Aug. 27 12:11:20) and the start of the picture material C 18 (1999 Aug. 28 10:03:10). The discontinuous position BC corresponds to an end time code of the picture material B 17 (00:04:10;00). These start time code and end time code are used as picture material time code information for cutting the picture material B 17 from the videotape 11. The last two numbers of the time code represent the frame number, and there are included 30 frames (from 0 to 29) of images per second.

Conventionally, the discontinuous positions of the date and time information are detected in the manner explained above, while reproducing the videotape 11 at normal speed. This allows detecting the discontinuous positions precisely, but it takes as much time as an actual time period required for reproducing the videotape 11, thereby being inefficient and time-consuming.

Figure 8A:
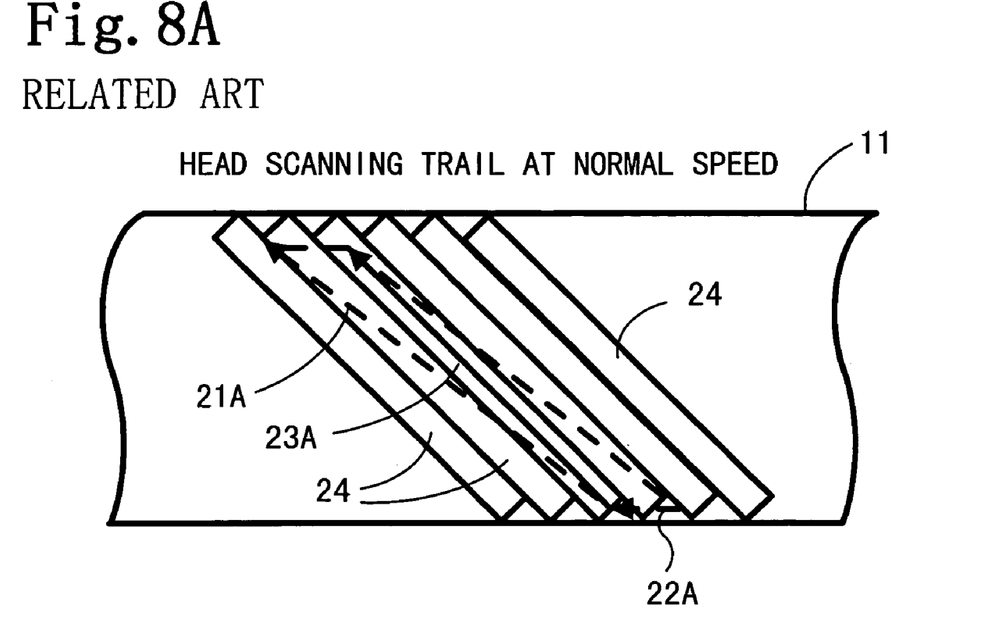
FIGS. 8A and 8B show the relationship between a tape feed speed and a scanning trail of a head.
Figure 8B:
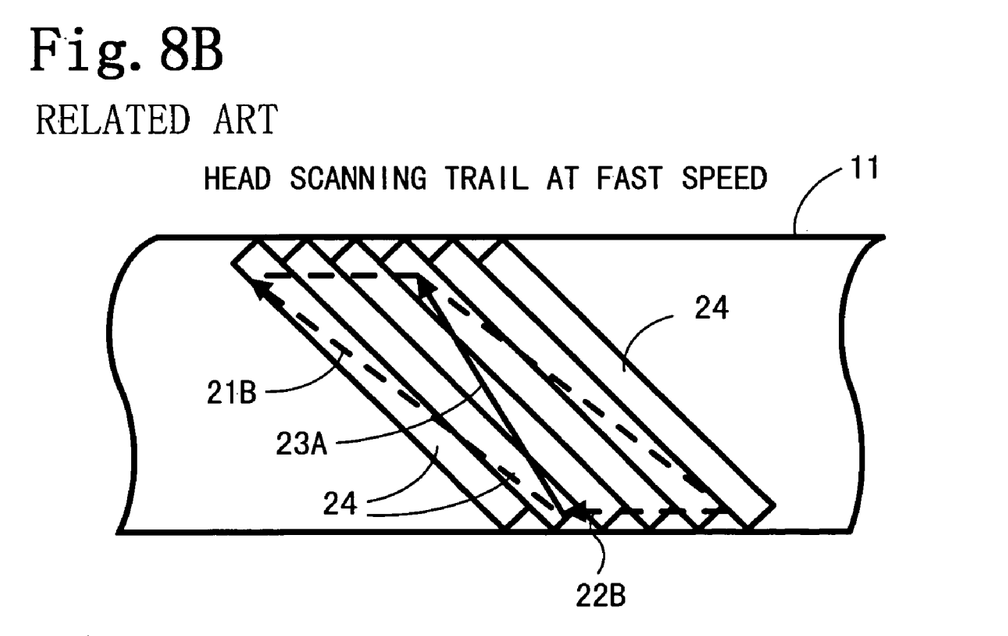
Figure 9:
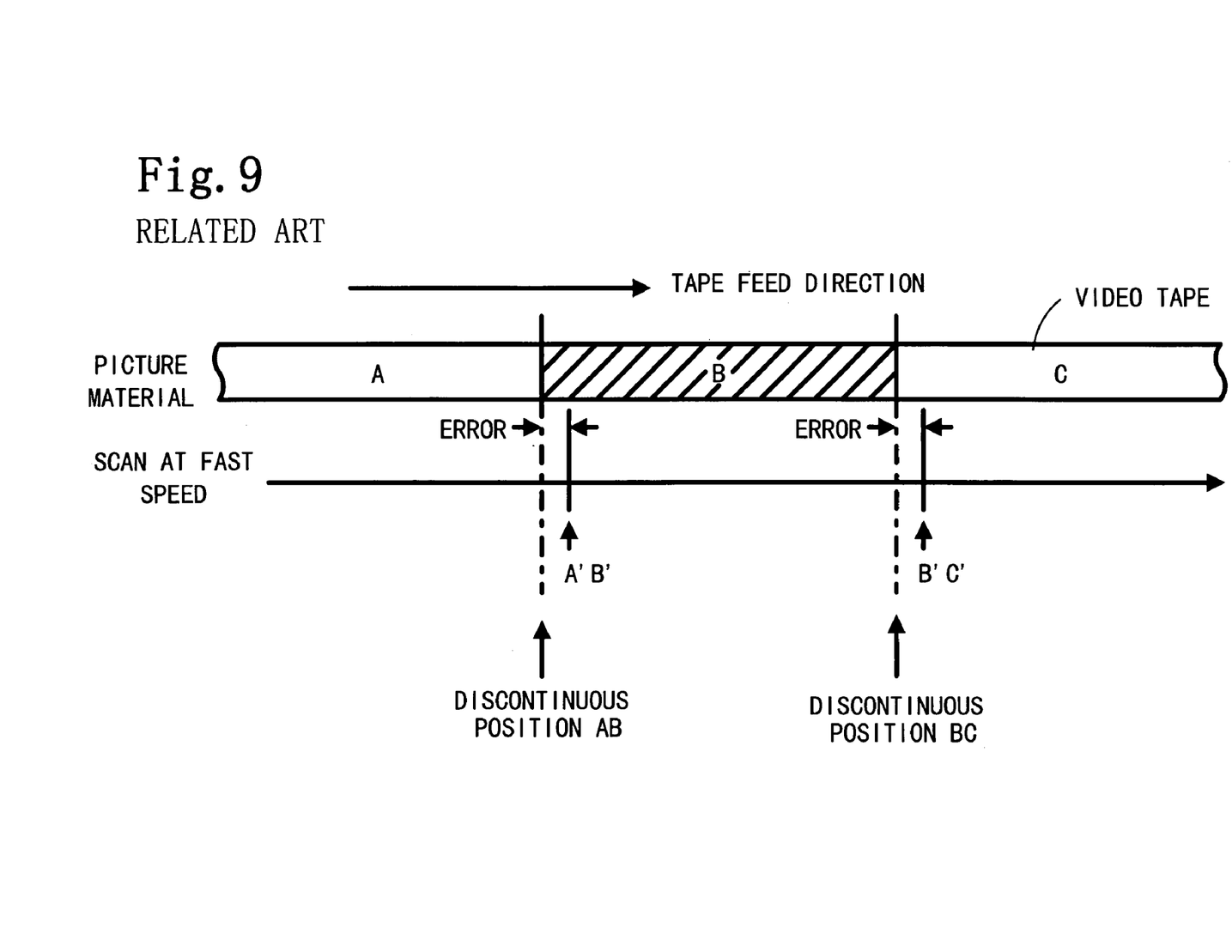
FIG. 9 shows errors occurred in detecting the discontinuous positions of the date and time information.

In order to overcome such a drawback, the detection of discontinuous positions is performed while fast-forwarding the videotape 11 or reproducing the videotape 11 at fast speed. However, this discontinuous position detection raises other problems as described below. FIGS. 8A and 8B show a relationship between a tape feed speed and a tape head scanning trail of a tape head. As shown in FIG. 8A, when reproducing the videotape 11 at normal speed, a head scan vector 23A that is defined by a tape head rotating speed vector 21A and a tape feed speed vector 22A is on a video track 24, namely, the tape head scans one video track 24. On the other hand, as shown in FIG. 8B, when fast-forwarding the videotape 11 or reproducing the videotape 11 at fast speed, a head scan vector 23B that is defined by a tape head rotating speed vector 21B and a tape feed speed vector 22B is diagonally spread over a plurality of video tracks 24, that is, the tape head scans over the plurality of video tracks 24. It is because the tape head rotating speed is kept constant without being increased, though the tape feed speed is increased. As a result, some of the date and time information and the time code information that should be detected is often skipped, without being detected. Therefore, the actual discontinuous positions of the date and time information will not be detected precisely, while fast-forwarding the videotape 11 and reproducing the videotape 11 at fast speed. The detected discontinuous positions often include some errors. The following problem comes up when cutting the picture material out of the videotape. FIG. 9 schematically shows errors occurred in detecting the discontinuous positions of the date and time information. It is illustrated that actual discontinuous positions AB and BC are mistakenly detected as incorrect discontinuous positions A'B' with detection errors. In a case where the picture material B is cut out of the videotape based on the incorrect discontinuous positions A'B' and B'C', in reality, a part of the picture material B is cut away, at the same time, a part of the picture material C that is adjacent to the picture material B is mixed into the picture material B.

In order to overcome the above-mentioned problem, there is proposed to roughly detect a discontinuous position of the date and time information while the videotape is fast-forwarded or reproduced at fast speed, to rewind the videotape, and then, to detect an actual discontinuous position while reproducing the videotape at normal speed. After detecting the actual discontinuous position, the videotape is again fast-forwarded or reproduced at fast speed to detect a next discontinuous position. However, in this method, the videotape has to be rewound many times, thereby requiring complicated procedures.

SUMMARY OF THE INVENTION

The invention has been developed to resolve the above-mentioned and other problems. According to the invention, there is provided a discontinuous position detecting device for detecting an actual discontinuous position between recording contents recorded on a recording medium, the discontinuous position detecting device including, a scanning unit that scans the recording medium in a first direction and in a second direction that is different from the first direction, a first detecting unit that detects a temporary discontinuous position located in a vicinity of the actual discontinuous position while the scanning unit scans the recording medium in the first direction, a second detecting unit that detects the actual discontinuous position while the scanning unit scans the recording medium in the second direction, and a scan controller that controls the scanning unit to scan the recording medium at a first scan speed except while the second detecting unit detects the actual discontinuous position, and to scan the recording medium at a second scan speed while the second detecting unit detects the actual discontinuous position, the second scan speed being slower than the first scan speed. More specifically, the scan controller controls the scanning unit to scan the recording medium within a predetermined detection area, including therein the actual discontinuous position and the temporary discontinuous position, in the second direction at the second speed. The discontinuous position detecting device also includes a time information reader that reads time information indicative of time of recording the recording contents. With the above configurations, it becomes possible to detect the actual discontinuous position of the date and time information precisely within a short period of time.

According to other exemplary embodiments of the invention, there is provided a method for detecting an actual discontinuous position between recording contents recorded on a recording medium and a computer-readable medium storing a program for detecting a discontinuous position between recording contents recorded on a recording medium.

BRIEF DESCRIPTION OF THE DRAWINGS

The above and other objects, features and advantages of the invention will become more apparent from the following description of the exemplary embodiments taken in connection with the accompanying drawings in which.

DETAILED DESCRIPTION OF EXEMPLARY EMBODIMENTS

A discontinuous position detecting device, a method of detecting a discontinuous position, and a computer-readable medium storing a program for detecting a discontinuous position between recording contents recorded on a recording medium according to various exemplary embodiments of the invention, will be explained while referring to the accompanying drawings. Herein, the term "scan at normal speed" means "to reproduce at normal speed", while the term "scan at fast speed" means "to fast-forward or reproduce at fast speed". Further, the term "picture data" refers to "data including video data and audio data".

Figure 1:
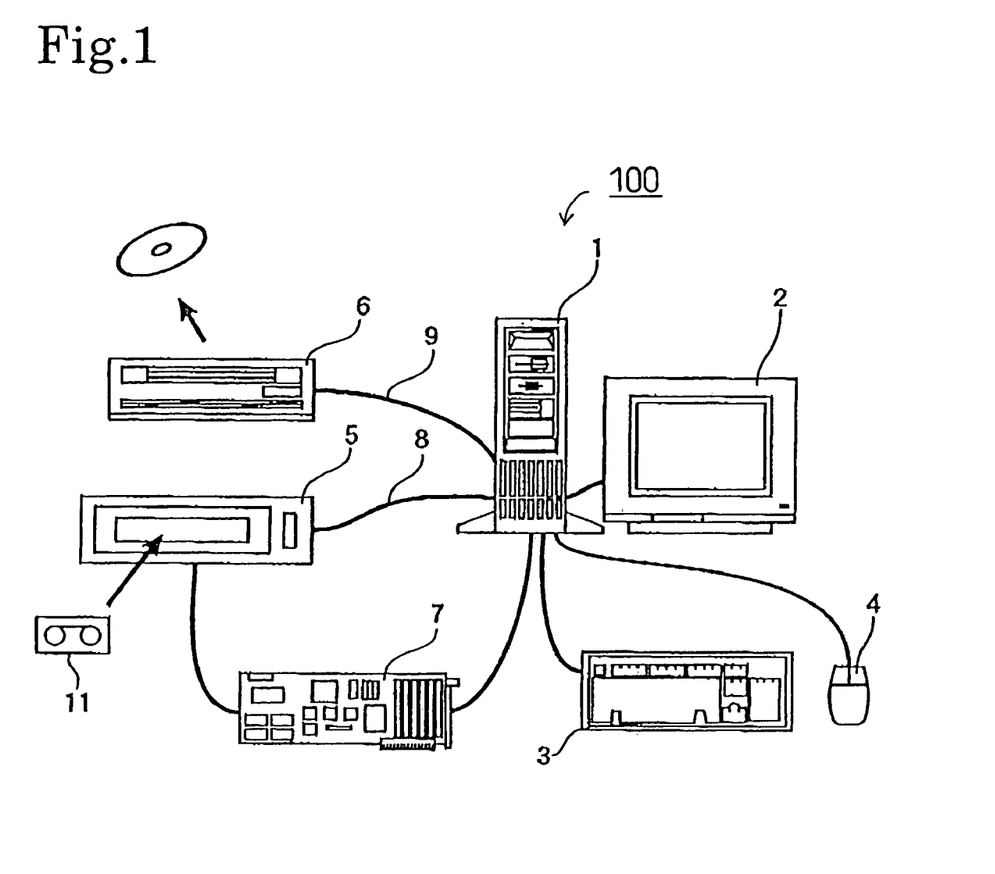
FIG. 1 is a perspective view of a picture editing device according to the invention.

FIG. 1 is a perspective view of a picture editing device 100 according to the invention. The picture editing device 100 comprises an picture data generating unit 1, for example, a personal computer (PC), a display 2 including, for example, a CRT, a keyboard 3, a mouse 4, a digital video deck 5 (hereinafter referred to as a video deck) that functions as a picture data reproducing unit for reproducing a videotape, an optical disk recording unit 6 for recording the picture data into a multimedia optical disk, such as a DVD, and an encoder 7 for encoding (compressing) the picture data, reproduced by the video deck 5, to be output. The video deck 5 and the optical disk recording unit 6 are connected to the picture data generating unit 1 via an IEEE1394 interface 8 and a SCSI interface 9, respectively. In this embodiment, the picture data generating unit 1 includes an ordinary personal computer that is commercially available.

Figure 2:
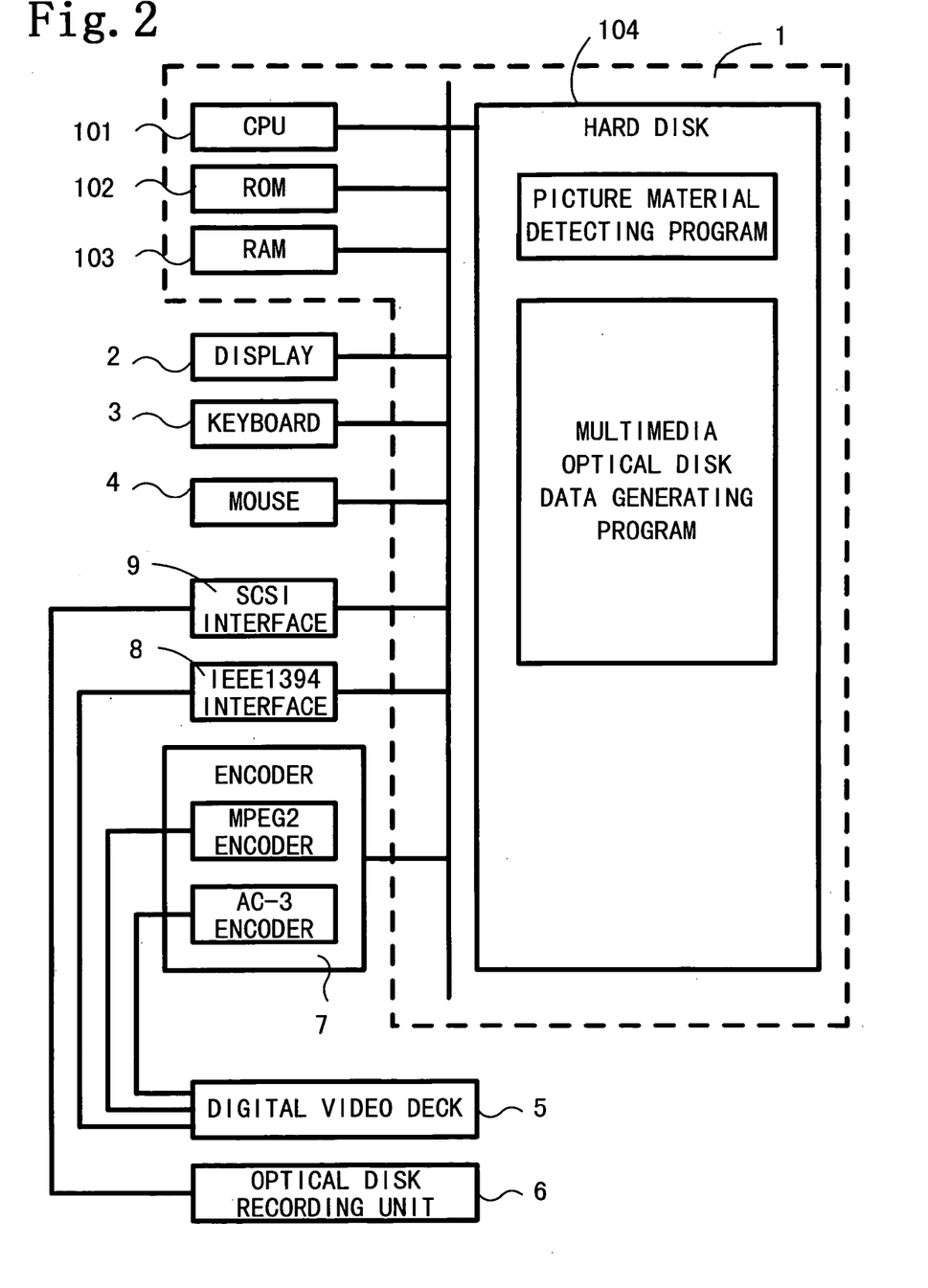
FIG. 2 is a block diagram of the picture editing device of FIG. 1.

FIG. 2 is a block diagram of the picture editing device 100. The picture data generating unit 1 comprises a CPU 101, a ROM 102 storing, for example, a BIOS program, a RAM 103 for storing various data temporarily, and a hard disk 104. The hard disk 104 stores various programs to be executed by the picture data generating unit 1 to perform various processes, such as a picture material detecting program for detecting and cutting user-selected picture materials and a multimedia optical disk data generating program including a scenario information input program. The above-mentioned components are connected with one another via a bus. The CPU 101 controls the video deck 5 to reproduce, fast-forward and stop the videotape 11, by executing a control program stored in the hard disk 104 with the operation of the keyboard 3 or the mouse 4, and outputting control signals to the video deck 5 via the IEEE1394 interface 8. As mentioned above, the videotape 11 stores, in a sub code area, data and time information indicative of the date and time of recording, and time code information indicative of the tape position used for reproducing and editing. The date and time information, the time code information, and the video data indicative of a still image are input into the picture data generating unit 1 from the video deck 5 via the IEEE1394 interface 8. Herein, the still image corresponds to a frame of an image at a certain position on the videotape 11, and can be displayed on the display 2 to be identified by a user.

Figure 3:
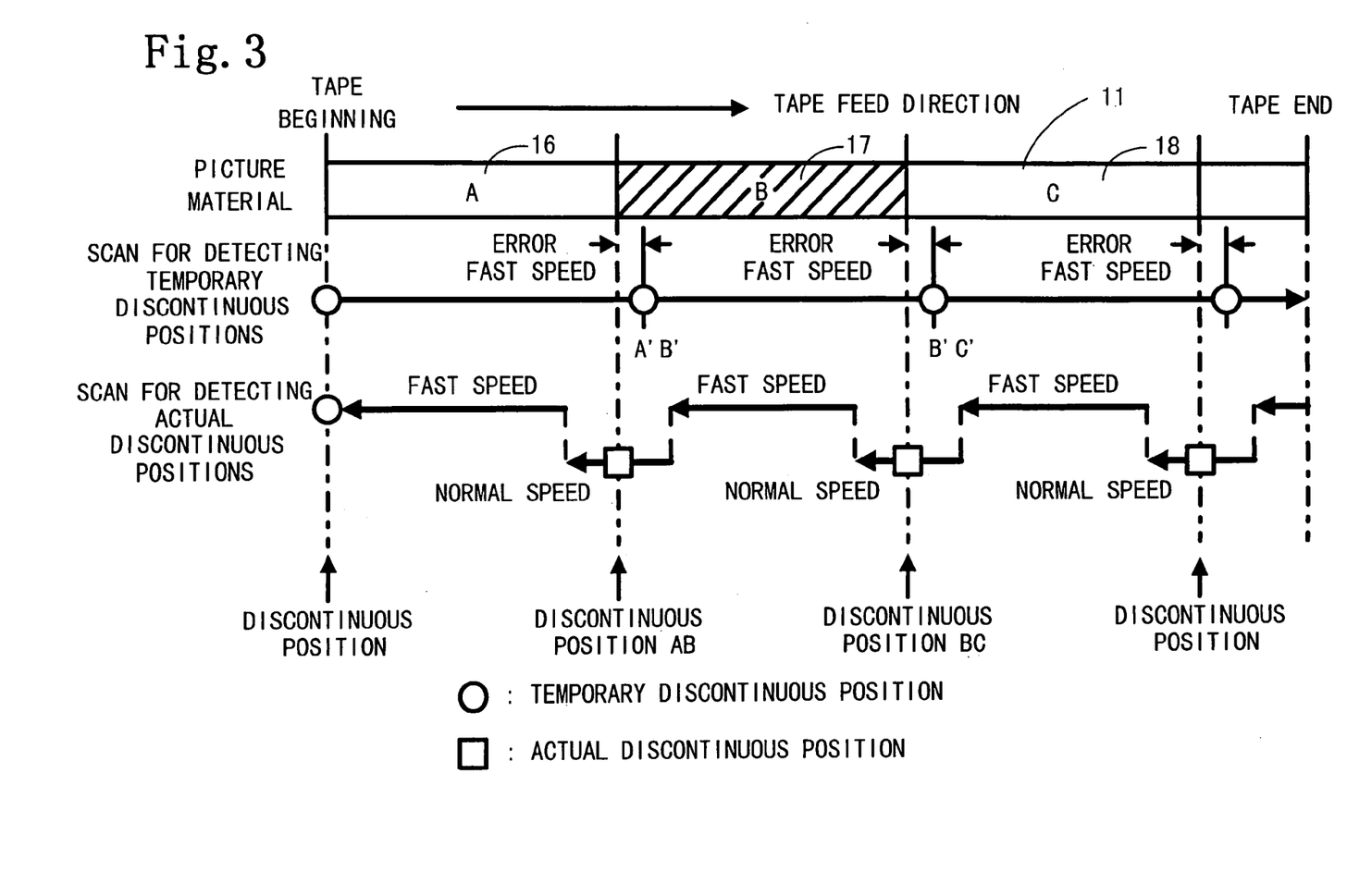
FIG. 3 schematically illustrates a concept for detecting a discontinuous position of date and time information according to the invention.

As described above, when scanning the videotape 11 at normal speed in the tape feed direction, the tape head of the video deck 5 scans a video track 24 as indicated by the head scan vector 23A of FIG. 8A. However, when scanning the videotape 11 at the fast speed, the tape head scans the plurality of video tracks 24, as indicated by the head scan vector 23B of FIG. 8B. In addition, as the date and time information and the time code information is read from the video deck 5 via the IEEE1394 interface 8 at a fixed timing, regardless of tape feed speed, the interval between tape positions, at which the date and time information and the time code information is detected, is increased. For these reasons, actual discontinuous positions AB and BC are mistakenly detected as incorrect discontinuous positions A'B' and B'C', respectively, as shown in FIG. 3. Namely, the picture material time code information (a start time code and an end time code of a picture material to be cut) detected in scanning the videotape 11 at fast speed includes some detection errors.

FIG. 3 schematically shows the concept for detecting discontinuous positions of date and time information according to the invention. As shown in FIG. 3, the picture materials A 16, B 17 and C 18 are recorded on the videotape 11. According to the invention, the videotape 11 is firstly scanned at fast speed in a direction indicated by an arrow of FIG. 3 from a start to an end of a designated scan area, while detecting incorrect discontinuous positions A'B' and B'C' that includes some detection errors (referred to as temporary discontinuous positions). Next, the videotape 11 is scanned in reverse at fast speed up to peripheries of the detected temporary discontinuous positions A'B' and B'C'. The videotape 11 is then scanned in reverse at normal speed from the peripheries of the temporary discontinuous A'B' and B'C' to detect actual discontinuous positions AB and BC precisely. As the tape head of the video deck 5 scans the video track 24 as indicated by the head scan vector 23A of FIG. 8A while scanning the videotape at normal speed, the detected actual discontinuous positions AB and BC do not include detection errors. The scan area is optionally designated on time code basis. Although it has been assumed that the videotape 11 is fed and rewound within the designated scan area to detect the discontinuous positions, any specific scan area may not be designated. In such a case, the videotape 11 is fed and rewound from the tape beginning, whose time code is 00:00:00;00, to the tape end.

Figure 4:
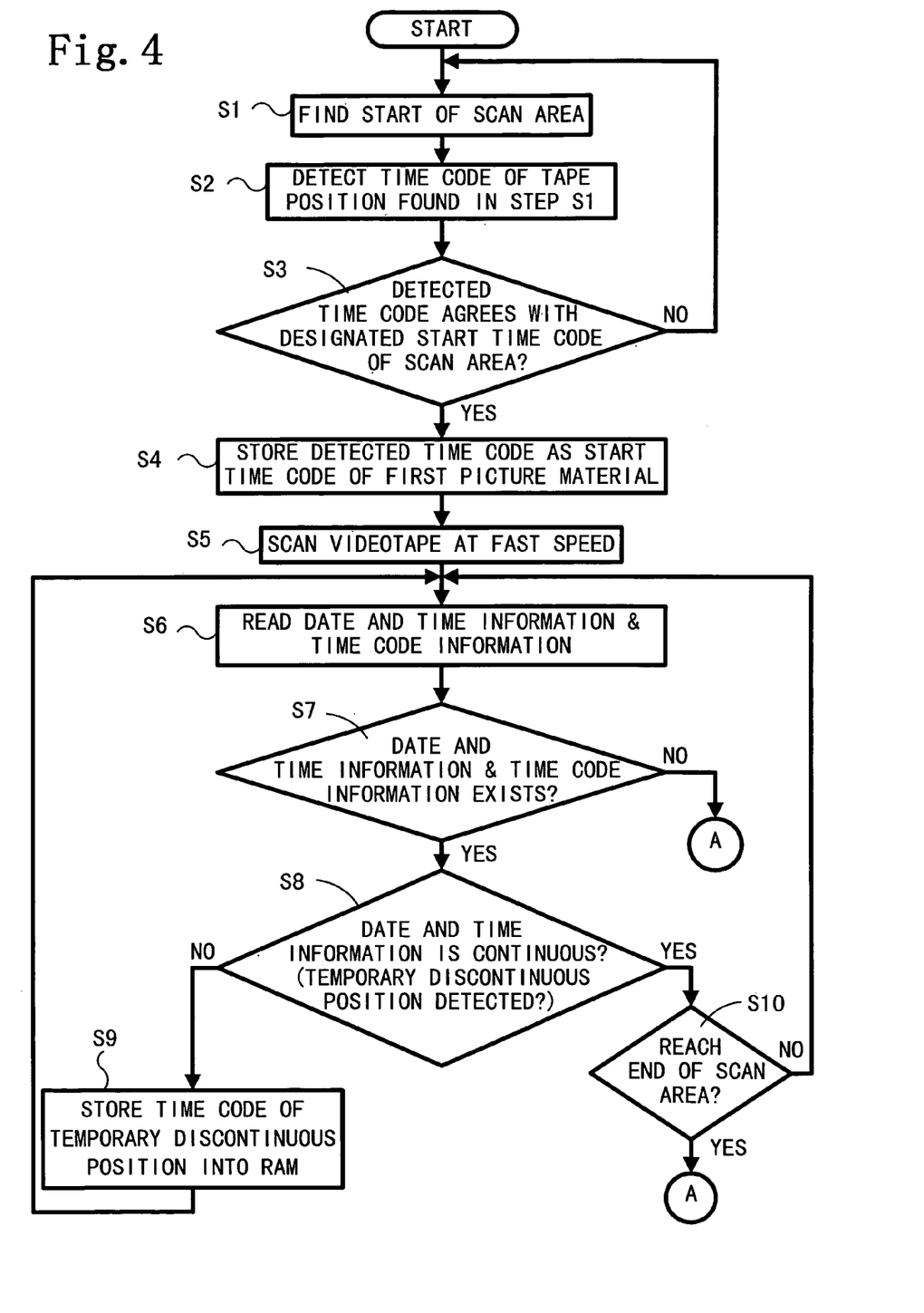
FIGS. 4 and 5 are flowcharts for detecting the discontinuous positions of the date and time information according to the invention.
Figure 5:
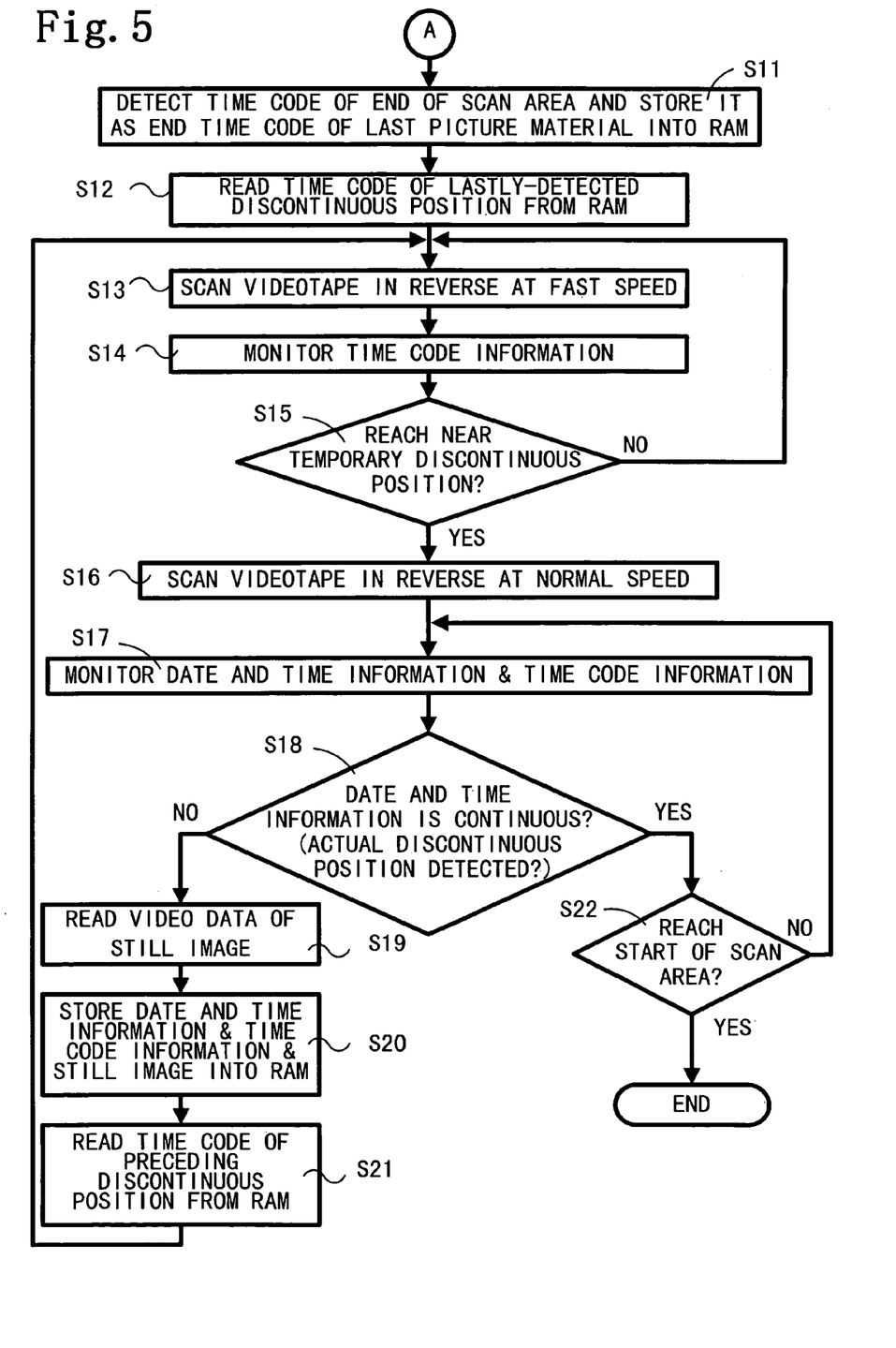

FIGS. 4 and 5 are flowcharts for detecting the discontinuous positions of the date and time information according to this embodiment of the invention. Herein, it is assumed that a user has previously designated a scan area with the knowledge of a start time code of a first picture material and an end time code of a last picture material.

In step S1, the CPU 101 controls the video deck 5 to find the start of the designated scan area on the videotape 11. As mentioned above, if a scan area has not been designated, the CPU 101 controls the video deck 5 to find the tape beginning, whose time code is 00:00:00;00, in step S1. In step S2, the CPU 101 reads the time code information of the tape position found in step S1. Then, the CPU 101 confirms, in step S3, whether the time code information detected in step S2 agrees with the time code information of the start of the designated scan area. If there is no agreement (No in step S3), the CPU 101 continues controlling the video deck 5 to find the start of the designated scan area. If there is agreement (Yes in step S3), the CPU 101 stores the detected time code information as the start time code of the first picture material in the RAM 103 in step S4, while pausing the tape feeding. Next, the CPU 101 controls to the video deck 5 to scan the videotape 11 at fast speed in step S5, and reads the date and time information and the time code information in step S6. The CPU 101 confirms, in step S7, whether there exists the date and time information and the time code information in the scanned area, that is, confirms the presence or absence of the picture material. If there is no information (No in step S7), the CPU 101 moves to the routines of the flowchart of FIG. 5. If there is information (Yes in step S7), the CPU 101 determines whether the detected date and time information is continuous or discontinuous in step S8.

As described above, the tape head scans over a plurality of video tracks when scanning the videotape 11 at fast speed, whereby the frequency of reading the date and time information becomes low. In addition, if the picture data generating unit 1 does not have high ability, thereby being slow in data manipulation and data transmission, the picture data generating unit 1 detects the data information with low, inefficient frequency, or at a bad timing. For such reasons, the CPU 101 mistakenly detects that the date and time information is discontinuous, even if the date and time information is in fact continuous. Therefore, it is desirable to determine that the date and time information is discontinuous only when there is a certain length of time between the currently-detected date and time information and the precedingly-detected date and time information (hereinafter referred to as a discontinuous position time length). Further, it may be desired that a collection of small picture materials, which has been recorded with short time intervals therebetween, is cut out of the videotape 11 as one integrated picture material, without cutting out the small picture materials individually, so that the small picture materials could be edited as one picture material. In such a case, the above-mentioned discontinuous position time length is set for more than the time intervals between recording the small picture materials. The user can optionally set the discontinuous position time length, for example, at least 2 seconds, before starting a series of the routines of the flowchart of FIG. 4.

Then, if the information is discontinuous (No in step S8), for example, the temporary discontinuous position A'B' is detected, the time code of the discontinuous position A'B' is stored in the RAM 103 in step S9. Herein, the temporary discontinuous position A'B' is not an actual discontinuous position AB, but is an incorrect one, because it is detected while scanning the videotape at fast speed. After storing the detected discontinuous position, the CPU 101 goes back to step S6. If thereafter all information is continuous (Yes in step S8), the CPU 101 determines whether all the designated area is scanned from its start to end in step S10. If the scan has not ended (No in step S10), the CPU 101 repeats steps S6 to S10 until the CPU 101 finishes searching all discontinuous positions within the designated scan area, or until the CPU 101 finds a tape area in which the picture material is interrupted with no date and time information and/or time code information. If the scan has ended (Yes in step S10), the CPU 101 detects the time code of the end of the scan area as the end time code of the last picture materials, and stores it in the RAM 103 in step 11, while pausing the tape feeding.

Referring to the flowchart of FIG. 5, the CPU 101 reads, out of the RAM 103, the time code of the temporary discontinuous position that has been lastly detected, in step S12. This time code corresponds to the start time code of the last picture material. The CPU 101 controls the video deck 5 to scan the videotape 11 in reverse at fast speed in step S13, and monitors the time code information recorded on the videotape 11 in step S14. In a case where the time code read out of the RAM 103 in step S12 is in close vicinity to the end of the scan area, the CPU 101 controls the video deck 5 to scan the videotape 11 at normal speed in step S13. During scanning the videotape 11 in reverse, the CPU 101 compares the time code information that has been read out of the RAM 103 in step S12 (or, step S21 as described below) and the currently-detected time code information. In step S15, the CPU 101 determines whether the currently-detected time code information is within a predetermined time code period from the time code that has been read out of the RAM 103 in step S12 (or step 21). If the information is not within the predetermined time code period (No in step S15), the CPU goes back to step S13 so that the video deck 5 continues scanning the videotape 11 in reverse at fast speed. If the information is within the predetermined time code area (Yes in step S15), the CPU 101 controls the video deck 5 to change the tape feed speed from fast speed to normal speed in step S16. In step S17, the CPU 101 reads the time code information while scanning the videotape 11 in reverse at normal speed.

Herein, the tape feed speed has to become normal speed before reaching the actual discontinuous positions to be detected. The tape feed speed is gradually changed from fast speed to normal speed. Therefore, the above-mentioned time code period is determined in consideration of variations in operating time in which the tape feed speed is changed from fast speed to normal speed (that is, operating time of changing from rewinding or reproducing in reverse at fast speed to reproducing at normal speed), error span of the time code information generated while detecting the discontinuous positions in step S8, and the like.

Next, in step S18, the CPU 101 determines whether the date and time information is continuous or not, while scanning the videotape 11 in reverse at normal speed, for detecting the actual discontinuous position of the date and time information. If the information is discontinuous (No in step S18) (namely, the actual discontinuous position is detected), video data to be indicated as a still image is captured in step S19, and the time code, the date and time information and the video data of the still image are stored in the RAM 103 in step S20. Such a still image, captured in step S19, is useful to the user, for identifying the contents of the picture material.

In step S21, the CPU 101 reads the time code of the immediately-preceding discontinuous position out of the RAM 103, and moves to step S113. The routines of steps S13 to S21 are repeated until all the actual discontinuous positions are detected. In a case where the time code read out of the RAM 103 in step S21 is in close vicinity to the time code of the actual discontinuous position detected in step 18, the videotape 11 keeps being scanned at normal speed in step S13, without being scanned at fast speed. If the information is continuous (Yes in step S18), the CPU 101 determines whether all the designated scan area is scanned from its end to start in step S22. If the scan has not ended (No in step S22), the CPU 101 goes back to step S17 and repeats steps S13 to S21 until the CPU 101 finishes searching all the actual discontinuous positions within the designated scan area, or until the CPU 101 finds that the picture material is interrupted with no date and time information and/or time code information recorded on the videotape 11.

When all the designated scan area is finished being scanned (Yes in step S22), one series of the routines represented by the flowcharts of FIGS. 4 and 5 is finished.

In the above-explained embodiment, it is assumed that the user has previously designated the scan area with the knowledge of the start time code of the first picture material and the end time code of the last picture material. In common, the user designates the scan area, because he knows the start time code of the first picture material and the end time code of the last picture material. Therefore, the time codes of the start and the end of the scan area correspond to the start time code of the first picture material and the end time code of the last picture material, respectively. However, the user may designate the scan area by rough estimation, and such a designated scan area might lie from some midpoint in a picture material to some midpoint in another picture material. In this case, the start and the end of the scan area are detected, in steps S4 and S11, as a start time code of the first picture material and the end time code of the last picture material, respectively, although the time codes of the start and the end of the scan area do not really correspond to the start time code of the first picture material and the end time code of the last picture material.

In the above embodiment, the temporary discontinuous positions A'B' and B'C' are detected while feeding the videotape 11 in tape reproduction direction, the actual discontinuous positions AB and BC are detected while rewinding the videotape 11 in the reverse direction. It is however possible to detect the temporary discontinuous positions A'B' and B'C' while rewinding the videotape 11 in the reverse direction, and then, to detect the actual discontinuous positions AB and BC while feeding the videotape 11 in tape reproducing direction. Accordingly, if the process for detecting the discontinuous positions is started from a vicinity of the end of the designated scan area (or the tape end in a case where any scan area is designated), the videotape 11 could be fed first to the end of the scan area, rewound in the reverse direction to detect the temporary discontinuous positions, and fed in tape reproduction direction to detect the actual discontinuous positions. This makes it possible to reduce the time required for detecting the actual discontinuous positions.

The detected time code information that corresponds to the actual discontinuous positions is displayed on the display 2 to be seen by the user. By using the detected discontinuous position, the picture materials can be cut out of the videotape 11 and edited at the user's discretion. In order to manage the picture materials to be edited and recorded on a multi-media optical disk (such as a DVD), scenario information is generated by inputting the detected time code information into an input form, with titles of the picture materials, according to the scenario information input program, as incorporated herein by reference to U.S. Pat. No. 6,721,495 issued April 13, 2004.

Although the invention has been described in detail through the specific embodiments, it would be apparent to those skilled in the art that various changes and modifications may be made therein without departing from the spirit of the invention.

For example, the detected time code information of the discontinuous position, the date and time information and the video data indicative of the still image could be stored in the hard disk 104.

There is no need, for the picture editing device 100 of the invention, to have the CPU 101, the ROM 102 and the RAM 103 individually. The picture editing device 100 of the invention may be comprised of the video deck 5 (or a video camera) that incorporates the functions of the CPU 101, the ROM 102 and the RAM 103 therein and a TV screen connected to the video deck 5, for showing a list of the date and time information and the time code information detected according to the invention.

Alternatively, the picture editing device 100 of the invention may be comprised of two video decks 5 (or two video cameras): one for data editing and another for controlling data editing and data transmission via the IEEE1394 interface 8, and a TV screen connected to the video deck 5. In such a case, the latter video deck incorporates the functions of the CPU 101, the ROM 102 and the RAM 103 therein.

The video decks 5 are operated with an operating panel or a remote controller thereof, in place of the keyboard 3 and the mouse 4. The detected date and time information and time code information can be displayed on the TV screen.

Further, the picture editing device 100 of the invention may be comprised of the video deck 5 (or video camera) for data editing, the optical disk recording unit 6 for controlling data editing and data transmission via the IEEE1394 interface 8 and a TV screen connected to the video deck 5. In this case, the video deck 5 incorporates the functions of the CPU 101, the ROM 102 and the RAM 103 therein, whereas the optical disk recording unit 6 incorporates the function of the encoder 7 therein. The video deck 5 is operated for controlling manipulation of data with an operating panel or a remote controller thereof in place of the keyboard 3 and the mouse 4.

Though the videotape is fed at normal speed while detecting the actual discontinuous positions, in the above-explained embodiment, the videotape could be fed at slower speed than normal speed. By this, it becomes possible to detect the actual discontinuous positions precisely, even if the picture data generating unit does not have high ability, thereby being slow in data manipulation and data transmission. The picture data generating unit of low ability may read information on the videotape with low, inefficient frequency or at a bad timing, but is able to read all the required information per frame.

What is claimed is:

1. A discontinuous position detecting device for detecting an actual discontinuous position between recording contents recorded on a recording medium, comprising:
    a scanning unit that scans the recording medium in a first direction and in a second direction that is opposite to the first direction;
    a first detecting unit that detects a temporary discontinuous position located in a vicinity of the actual discontinuous position while the scanning unit scans the recording medium in the first direction;
    a second detecting unit that detects the actual discontinuous position while the scanning unit scans the recording medium in the second direction; and
    a scan controller that controls the scanning unit to scan the recording medium at a first scan speed except while the second detecting unit detects the actual discontinuous position, and to scan the recording medium at a second scan speed while the second detecting unit detects the actual discontinuous position, the second scan speed being slower than the first scan speed.

2. The discontinuous position detecting device as claimed in claim 1, wherein the scan controller controls the scanning unit to scan the recording medium at the second scan speed in the second direction within a predetermined detection area including therein the actual discontinuous position and the temporary discontinuous position.

3. The discontinuous position detecting device as claimed in claim 2, wherein the recording medium further records thereon time information indicative of time of recording the recording contents.

4. The discontinuous position detecting device as claimed in claim 3, wherein the time information includes information on dates of recording the recording contents.

5. The discontinuous position detecting device as claimed in claim 3, further comprising:
    a time information reader that reads the time information, and wherein the first detecting unit and the second detecting unit detect the temporary discontinuous position and the actual discontinuous position, respectively, if the time information changes by at least a predetermined time difference.

6. The discontinuous position detecting device as claimed in claim 5, wherein the time information reader includes a time information storage unit that stores the time information corresponding to the detected discontinuous position and a display that displays thereon the time information stored in the time information storage unit.

7. The discontinuous position detecting device as claimed in claim 5, further comprising:
    a time difference setting unit that sets the predetermined time difference.

8. The discontinuous position detecting device as claimed in claim 2, wherein the first detecting unit detects a plurality of temporary discontinuous positions in a predetermined scan area, and the second detecting unit detects a plurality of actual discontinuous positions, each of the plurality of temporary discontinuous positions corresponding to one of the plurality of actual discontinuous positions, and wherein the scan controller controls the scanning unit to scan the recording medium in the first direction throughout the predetermined scan area while the first detecting unit detects the plurality of temporary discontinuous positions, and to scan the recording medium in the second direction throughout the predetermined scan area while the second detecting unit detects the plurality of actual discontinuous positions.

9. The discontinuous position detecting device as claimed in claim 8, wherein the scan controller controls the scanning unit to keep scanning at the second scan speed, when any adjacent two temporary discontinuous positions are located in a vicinity of each other.

10. The discontinuous position detecting device as claimed in claim 2, wherein the recording medium further records thereon positional information indicative of a position on the recording medium, the discontinuous position detecting device further comprising a positional information reader that reads the positional information.

11. The discontinuous position detecting device as claimed in claim 10, wherein the positional information reader has a positional information storage unit that stores the positional information corresponding to the temporary discontinuous position.

12. The discontinuous position detecting device as claimed in claim 11, wherein the scan controller has a detection area setting unit that sets the predetermined detection area based on the positional information corresponding to the temporary discontinuous position stored in the storage unit.

13. The discontinuous position detecting device as claimed in claim 1, wherein the recording medium is tape-shaped.

14. A method for detecting an actual discontinuous position between recording contents recorded on a recording medium, the method comprising:
    scanning the recording medium in a first direction at a first scan speed;
    detecting a temporary discontinuous position located in a vicinity of the actual discontinuous position, while scanning the recording medium in the first direction at the first scan speed;
    scanning the recording medium in a second direction that is opposite to the first direction at the first scan speed up to a vicinity of the temporary discontinuous position;
    scanning the recording medium in the second direction from the vicinity of the temporary discontinuous position at a second scan speed, the second scan speed being slower than the first scan speed; and detecting the actual discontinuous position, while scanning the recording medium in the second direction at the second scan speed.

15. The method as claimed in claim 14, further comprising:

reading time information recorded on the recording medium indicative of time of recording the recording contents;

setting a predetermined time difference; and detecting the temporary discontinuous position and the actual discontinuous position, if the time information changes by at least the predetermined time difference.

16. The method as claimed in claim 14, further comprising:

detecting a plurality of temporary discontinuous positions in a predetermined scan area;

detecting a plurality of actual discontinuous positions, each of the plurality of temporary discontinuous positions corresponding to one of the plurality of actual discontinuous positions;

scanning the recording medium in the first direction throughout the predetermined scan area while detecting the plurality of temporary discontinuous positions; and scanning the recording medium in the second direction throughout the predetermined scan area while detecting the plurality of actual discontinuous positions.

17. The method as claimed in claim 16, further comprising:

maintaining scanning at the second scan speed, when any adjacent two temporary discontinuous positions are located in the vicinity of each other.

18. A computer-readable medium storing a program for detecting a discontinuous position between recording contents recorded on a recording medium, the program comprising:

a program for scanning the recording medium in a first direction at a first scan speed;

a program for detecting a temporary discontinuous position located in a vicinity of the actual discontinuous position, while feeding the recording medium in the first direction at the first scan speed;

a program for scanning the recording medium in a second direction that is opposite to the first direction at the first scan speed up to a vicinity of the temporary discontinuous position;

a program for scanning the recording medium in the second direction from the vicinity of the temporary discontinuous position at a second scan speed, the second scan speed being slower than the first scan speed; and a program for detecting the actual discontinuous position, while feeding the recording medium in the second direction at the second scan speed.

19. The computer-readable medium as claimed in claim 18, further comprising:

a program for reading time information recorded on the recording medium indicative of time of recording the recording contents;

a program for setting a predetermined time difference; and a program for detecting the temporary discontinuous position and the actual discontinuous position, if the time information changes by at least the predetermined time difference.

20. The computer-readable medium as claimed in claim 18, further comprising:

a program for detecting a plurality of temporary discontinuous positions in a predetermined scan area;

a program for detecting a plurality of actual discontinuous positions, each of the plurality of temporary discontinuous positions corresponding to one of the plurality of actual discontinuous positions;

a program for scanning the recording medium in the first direction throughout the predetermined scan area while detecting the plurality of temporary discontinuous positions; and a program for scanning the recording medium in the second direction throughout the predetermined scan area while detecting the plurality of actual discontinuous positions.

21. The computer-readable medium as claimed in claim 20, further comprising:

a program for maintaining scanning at the second scan speed, when any adjacent two temporary discontinuous positions are located in the vicinity of each other.

* * * * *